(12) United States Patent
Smith et al.

(10) Patent No.: US 7,101,310 B2
(45) Date of Patent: Sep. 5, 2006

(54) MODEL-BASED CONTROL FOR TORQUE BIASING SYSTEM

(75) Inventors: William E. Smith, Liverpool, NY (US); Eric A Bansbach, Fayetteville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 115 days.

(21) Appl. No.: 10/827,550

(22) Filed: Apr. 19, 2004

(65) Prior Publication Data
US 2005/0233858 A1 Oct. 20, 2005

(51) Int. Cl.
F16H 59/64 (2006.01)
B60W 10/02 (2006.01)
G06F 7/00 (2006.01)
H02K 17/32 (2006.01)
G05B 5/00 (2006.01)

(52) U.S. Cl. ............................ 477/98; 477/76; 477/174; 701/68; 318/433; 318/434; 318/471

(58) Field of Classification Search ................. 477/76, 477/98, 174–175, 177, 179, 180; 318/432–434, 318/471–473; 701/67, 68
See application file for complete search history.

(56) References Cited

U.S. PATENT DOCUMENTS

| | | | | |
|---|---|---|---|---|
| 4,789,040 A | * | 12/1988 | Morishita et al. | 180/446 |
| 5,337,866 A | * | 8/1994 | Sturmer et al. | 477/175 |
| 5,938,561 A | * | 8/1999 | Schubert | 477/79 |
| 6,107,767 A | * | 8/2000 | Lu et al. | 318/432 |
| 6,151,544 A | * | 11/2000 | Amisano et al. | 701/67 |
| 6,206,803 B1 | * | 3/2001 | Baer et al. | 477/174 |
| 6,716,136 B1 | * | 4/2004 | Hrovat et al. | 477/100 |
| 6,734,648 B1 | * | 5/2004 | Fukumura et al. | 318/468 |
| 6,734,649 B1 | * | 5/2004 | Sardar | 318/432 |
| 6,752,743 B1 | * | 6/2004 | Eich et al. | 477/175 |
| 6,756,757 B1 | * | 6/2004 | Marcinkiewicz et al. | 318/432 |
| 6,808,052 B1 | * | 10/2004 | Kirkwood et al. | 192/35 |
| 6,896,112 B1 | * | 5/2005 | Berger et al. | 192/52.4 |
| 6,929,580 B1 | * | 8/2005 | Frotscher | 477/76 |
| 2002/0053892 A1 | * | 5/2002 | Schaer et al. | 318/432 |

* cited by examiner

*Primary Examiner*—Roger Pang
(74) *Attorney, Agent, or Firm*—Harness, Dickey & Pierce, P.L.C.

(57) ABSTRACT

A method of controlling a torque biasing system includes determining a torque command, calculating a torque error based on the torque command and a model-based torque. A control signal is generated based on the torque error and the torque biasing system is operated based on the control signal.

32 Claims, 6 Drawing Sheets

MODEL-BASED CONTROL FOR TORQUE BIASING SYSTEM

FIELD OF THE INVENTION

The present invention relates to torque biasing systems, and more particularly to model-based control of a torque biasing system.

BACKGROUND OF THE INVENTION

Torque biasing systems can be implemented in vehicle components including, but not limited to, a transfer case, a power take-off unit (PTU) and an axle. Torque biasing systems regulate torque transfer between an input and an output. More specifically, a clutch pack is operably disposed between the input and the output. The degree of engagement of the clutch pack is varied to regulate the amount of torque transferred from the input to the output. For example, when the clutch pack is disengaged, there is no torque transfer from the input to the output. When the clutch pack is fully engaged or locked, all of the torque is transferred from the input to the output. When partially engaged, a corresponding portion of the torque is transferred from the input to the output.

The degree of clutch pack engagement is adjusted by a linear force that is imparted on the clutch pack via an actuator system. Traditional actuator systems include an electric motor and a clutch operator mechanism. The clutch operator mechanism converts the torque generated by the electric motor into the linear force, which can be amplified prior to being imparted on the clutch pack. The electric motor is controlled based on a control signal generated by a control system.

Conventional control systems use closed-loop control to regulate a specified system parameter. When the specified system parameter has an accurate means of feedback, such as is the case with direct sensing, the overall system accuracy is sufficient. In the case where the specified system parameter is not directly measurable, system accuracy is difficult to achieve.

Torque biasing systems are typically controlled based on a parameter other than torque, because torque is not easily measurable and torque sensors are not readily available. Torque sensors, however, would not be a total solution because the actual torque generated by a vehicle system is often much slower than is required by the biasing device. As a result, conventional torque biasing systems are not controlled as accurately as is desired.

SUMMARY OF THE INVENTION

Accordingly, the present invention provides a method of controlling a torque biasing system. The method includes determining a torque command, calculating a torque error based on the torque command and a model-based torque. A control signal is generated based on the torque error and the torque biasing system is operated based on the control signal.

In one feature, the method further includes processing a previous control signal through a torque biasing system model to generate the model-based torque. The torque biasing system model includes a motor model, a clutch operator model and a clutch model. The control signal is processed through the motor model to generate a clutch operator interconnection value. The clutch operator interconnection value is generated based on a resistance torque, a motor position signal and motor data.

In still another feature, the method further includes calculating the resistance torque using the clutch operator model. An interconnection position value is processed through the clutch operator model to generate a clutch interconnection value. The clutch interconnection value is generated based on a resistance force and clutch operator data. The resistance force is calculated using the clutch model.

In yet another feature, the method further includes processing a clutch interconnection value through the clutch model to generate the model-based torque.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
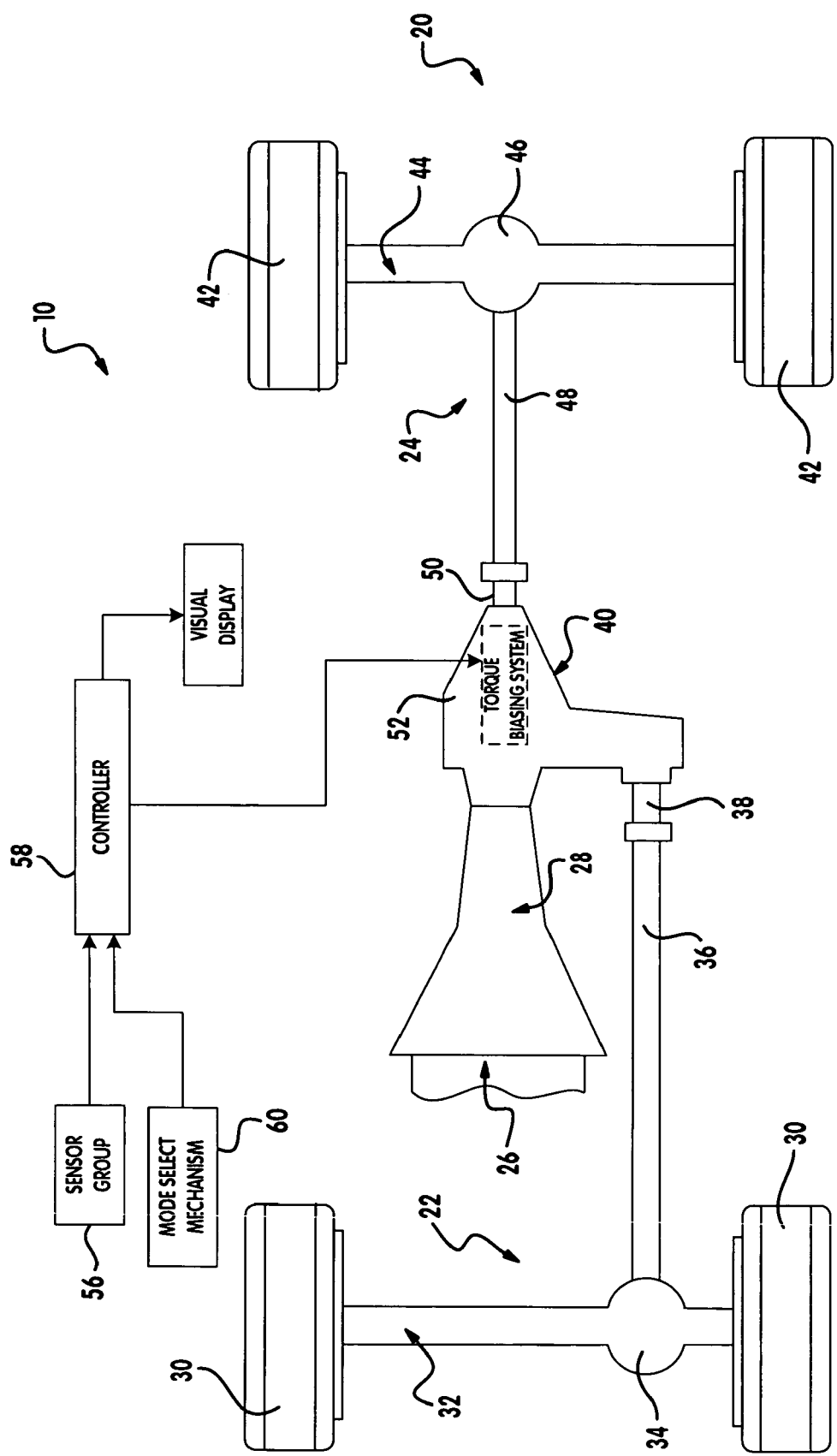
FIG. 1 is a schematic illustration of a vehicle including a transfer case that incorporates an exemplary torque biasing system.

Referring now to FIG. 1, a four-wheel drive vehicle 10 is illustrated. The vehicle includes a front drive line 22, a rear drive line 24, and a power source, such as an engine 26 (partially shown), which provides drive torque to the front and rear drive lines through a transmission 28. The transmission 28 may be either a manual or automatic shifting type. The front drive line 22 includes a pair of front wheels 30 connected to opposite ends of a front axle assembly 32 having a front differential 34. The front differential 34 is coupled to one end of a front prop shaft 36, the opposite end of which is coupled to a front output shaft 38 of a transfer case 40. Similarly, the rear drive line 24 includes a pair of rear wheels 42 connected to opposite ends of a rear axle assembly 44 having a rear differential 46. The rear differential 46 is coupled to one end of a rear prop shaft 48, the opposite end of which is coupled to a rear output shaft 50 of the transfer case 40. The transfer case 40 is equipped with an electronically-controlled torque biasing system 52 that is operable to control the magnitude of speed differentiation and torque distribution between the output shafts 38 and 50.

Adaptive actuation of the torque biasing system 52 is controlled by a control system that includes a group of sensors 56 for monitoring specific dynamic and operational characteristics of the vehicle 10 and generating sensor signals indicative thereof, and a controller 58 for generating control signals in response to the sensor input signals. Moreover, the controller 58 is adapted to control the actuated condition of torque biasing system 52 by generating digital control signals based on both the sensor input signals and torque biasing system model of the present invention.

A mode select mechanism 60 enables a vehicle operator to select one of the available drive modes. In particular, the controller 58 controls the torque biasing system 52 in response to a mode signal sent to the controller 58 from mode select mechanism 60. The mode signal indicates the particular drive mode selected. When an "adaptive" four-wheel drive mode is selected, the controller 58 operates to continuously monitor and automatically regulate the actuated condition of torque biasing system 52 between its non-actuated and fully actuated limits, thereby varying the magnitude of speed differentiation and torque distribution between output shafts 38 and 50. When the mode signal indicates that a "locked" four-wheel drive mode has been selected, the torque biasing system 52 is fully actuated, whereby non-differentiated power is delivered to output shafts 38 and 50. The locked four-wheel drive mode is provided to permit improved traction when the vehicle is operated off road or over severe road conditions.

Figure 2:
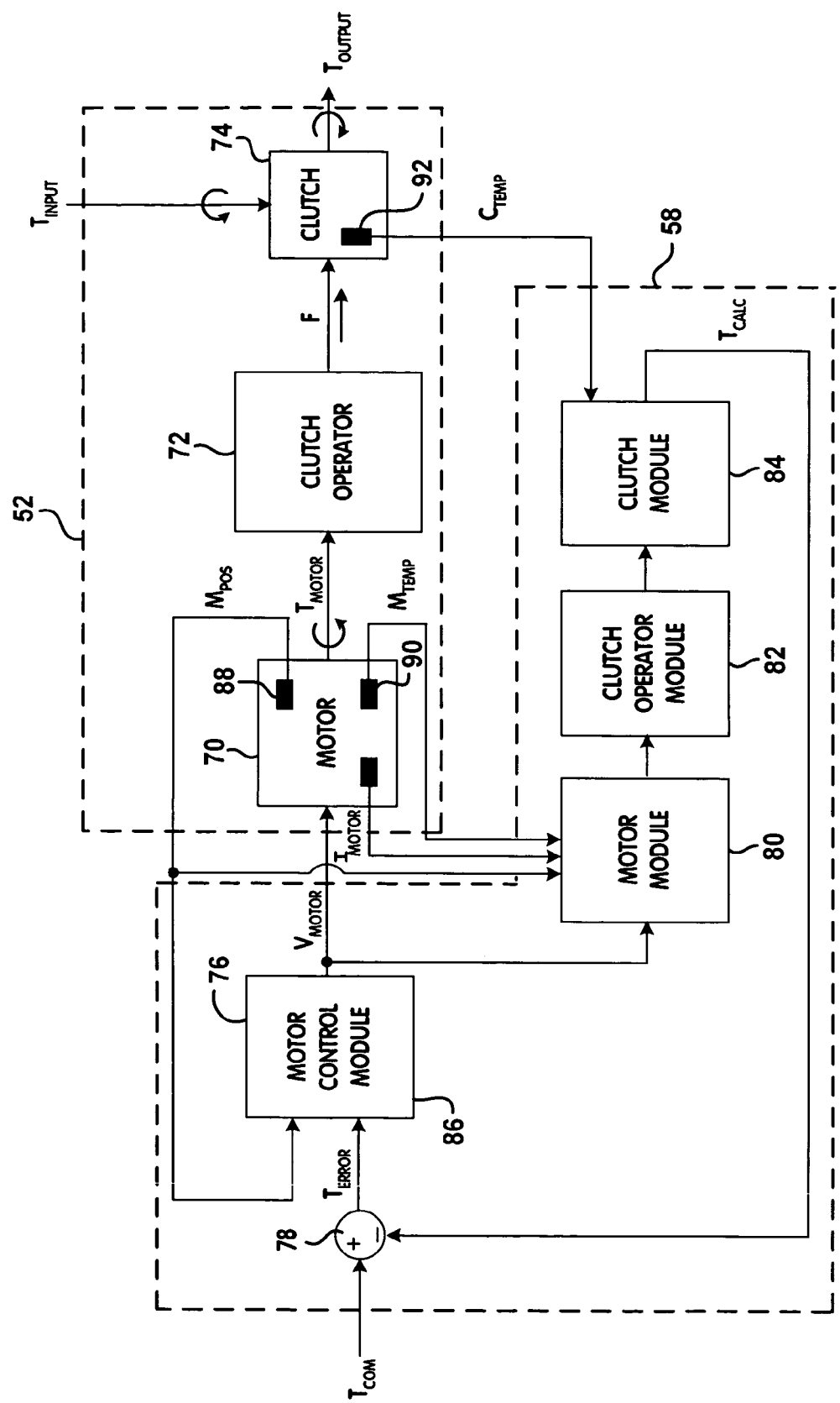
FIG. 2 is a logic diagram illustrating a model-based control system according to the present invention.

Referring now to FIG. 2, a schematic illustration of the torque biasing system 52 is shown. The torque biasing system 52 includes a motor 70, a clutch operator mechanism 72 and a clutch-pack 74. It is anticipated that the clutch operator mechanism includes a driven torque/force conversion device with an amplifier mechanism. Anticipated drivers include motors or solenoids. Anticipated torque/force conversion devices include cam/follower devices, dual cam plate devices and scissor plates and anticipated amplifier mechanisms include levers and ball ramps. An input torque ($T_{INPUT}$) is transferred through the clutch-pack 74 to provide an output torque ($T_{OUTPUT}$). The motor 70 is operated based on a control signal to manipulate the clutch operator mechanism 72. The gear reduction/shift lever system 72 imparts a linear force on the clutch-pack 74 that regulates engagement of the clutch-pack 74. $T_{OUTPUT}$ is based on the degree of clutch-engagement. The controller 58 generates the control signal as discussed in detail below.

Referring now to FIG. 2, the model-based control of the present invention will be described in detail. A torque command ($T_{COM}$) is generated based on vehicle inputs. $T_{COM}$ is the amount of torque that is to be transferred through the torque biasing system 52 and is a running calculation based on wheel speeds, yaw rate, throttle and the like. The wheel speeds, yaw rate and throttle signals are generated by the sensor group 56. A summer 78 generates a torque error ($T_{ERROR}$) as the difference between $T_{COM}$ and a model-based torque ($T_{CALC}$). The model-based control is implemented via a motor module 80, a clutch operator module 82 and a clutch module 84 as described in further detail below. More particularly, the motor module 80 is based on a motor model, the clutch operator module 82 is based on a shift system model and the clutch module 84 is based on a clutch model.

A motor control module 86 generates a motor voltage ($V_{MOTOR}$) based on $T_{ERROR}$ and a motor position signal ($M_{POS}$). The motor control module 86 is preferably a proportional, integral, derivative (PID) control module of a type known in the art. The motor 70 operates based on $V_{MOTOR}$ and includes a position sensor 88 and a temperature sensor 90. The position sensor 88 generates $M_{POS}$, which indicates the rotational position of the motor armature (not shown). The temperature sensor 90 generates a motor temperature signal ($M_{TEMP}$). The motor 70 generates a torque ($T_{MOTOR}$) that drives the shift system 72.

The shift system 72 generates a linear force (F) that is imparted on the clutch pack 74. F controls the engagement of the clutch pack 74. More particularly, as F increases, clutch slip is decreased until lock-up is achieved. During clutch slip, the input torque ($T_{INPUT}$) is greater than the output torque ($T_{OUTPUT}$). At clutch lock-up, $T_{INPUT}$ is equal to $T_{OUTPUT}$. In other words, all of $T_{INPUT}$ is transferred through the clutch-pack 74 during clutch lock-up. The clutch-pack 74 includes a temperature sensor 92 that generates a temperature signal ($C_{TEMP}$).

Figure 3:
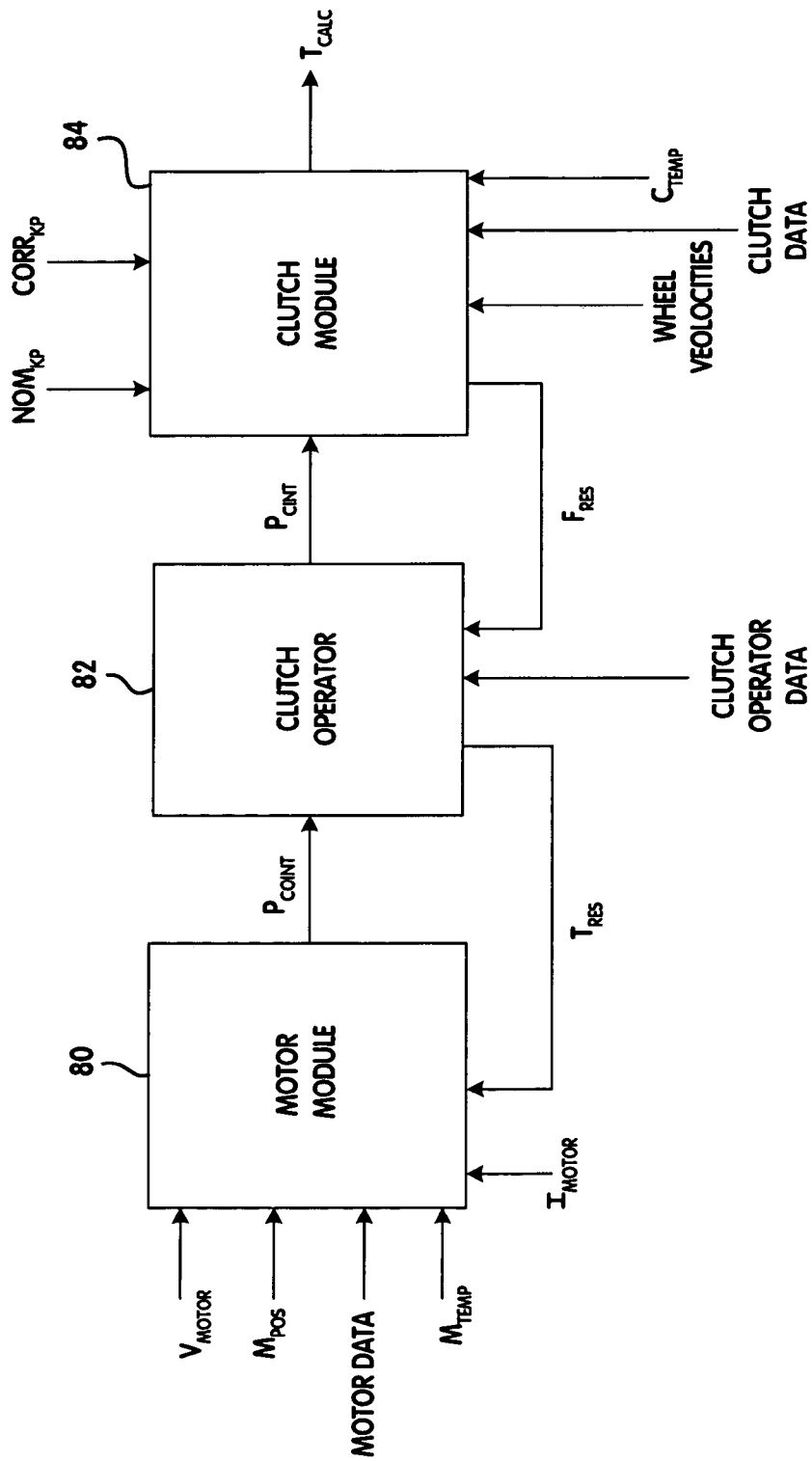
FIG. 3 is a logic diagram illustrating a torque biasing system model according to the present invention.

Referring now to FIG. 3, $T_{CALC}$ is determined based on motor data, $V_{MOTOR}$, $M_{POS}$, $M_{TEMP}$, $I_{MOTOR}$, shift system data and clutch data. More particularly, the motor module 80 determines a physical characteristic of the motor 70 (i.e., armature position) based on electrical motor characteristics (i.e. the motor data, $V_{MOTOR}$ and $I_{MOTOR}$) and physical motor characteristics (i.e., $M_{POS}$ and $M_{TEMP}$). The motor module 80 also accounts for the gear ratios of the gear reduction system. The motor module 80 generates a clutch operator interconnection position ($P_{COINT}$) based on the motor data, $V_{MOTOR}$, $M_{POS}$ and $M_{TEMP}$ and a resistance torque ($T_{RES}$). $T_{RES}$ is determined as discussed in further detail below. $P_{COINT}$ indicates the rotational position of the physical component (e.g., screw) that interconnects the motor 70 and the clutch operator mechanism 72.

The clutch operator module 82 determines a clutch interconnection position ($P_{CINT}$) based on the clutch operator data, $P_{COINT}$ and a resistance force ($F_{RES}$). $F_{RES}$ is determined by the clutch model 84 as discussed in further detail below. The shift system module 82 also calculates $T_{RES}$, which is fed back to the motor module 80. The clutch module 84 calculates $T_{CALC}$ based on clutch data, $C_{TEMP}$, wheel velocities, a nominal kiss point ($NOM_{KP}$) a corrected kiss point ($CORR_{KP}$) and $P_{CINT}$. The clutch module 84 also calculates $F_{RES}$, which is fed back to the shift system module 82.

Figure 4:
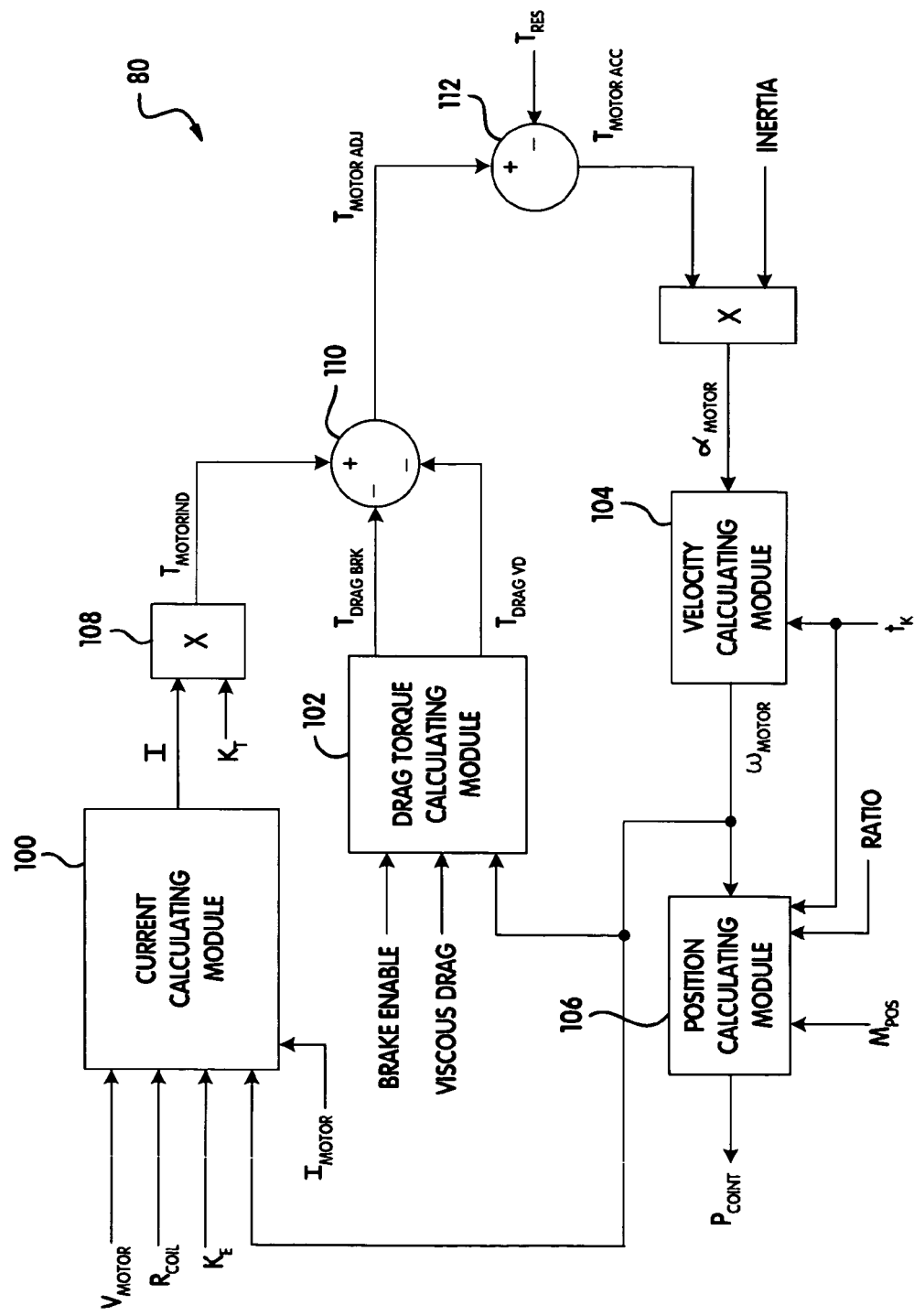
FIG. 4 is a logic diagram illustrating a motor module according to the present invention.

Referring now to FIG. 4, the motor module 80 will be discussed in further detail. The motor data is provided by the motor manufacturer and includes a current to torque conversion factor ($k_T$) a back EMF constant ($k_E$), brake on drag, brake off drag, viscous drag, coil resistance ($R_{COIL}$), inertia and gear ratio. The motor module 80 includes a current calculating module 100, a drag torque calculating module 102, a velocity calculating module 104 and a position calculating module 106. The current calculating module 100 calculates a current (I) based on $V_{MOTOR}$, $R_{COIL}$, $k_E$, $I_{MOTOR}$ and an angular velocity ($\omega_{MOTOR}$). $\omega_{MOTOR}$ is calculated by the velocity calculating module 104 as discussed in further detail below. A multiplier 108 multiplies I by $k_T$ to provide an indicated motor torque ($T_{MOTORIND}$).

The drag torque calculating module 102 calculates a brake drag torque ($T_{DRAGBRK}$) and a viscous damper drag torque ($T_{DRAGVD}$) based on $\omega_{MOTOR}$, a brake enable signal and the viscous drag motor data. More particularly, $T_{DRAGBRK}$ is calculated based on $\omega_{MOTOR}$ and either the brake on drag or the brake off drag motor data. If the brake enable signal indicates brake on, $T_{DRAGBRK}$ is determined based on the brake on drag motor data. If the brake enable signal indicates brake off, $T_{DRAGBRK}$ is determined based on the brake off motor data. $T_{DRAGVD}$ is determined based on $\omega_{MOTOR}$ and the viscous drag motor data. $T_{DRAGBRK}$ and $T_{DRAGVD}$ are subtracted from $T_{MOTOR}$ by a summer 110 to provide an adjusted motor torque ($T_{MOTORADJ}$).

$T_{RES}$ is subtracted from $T_{MOTORADJ}$ by a summer 112 to provide an acceleration motor torque ($T_{MOTORACC}$). $T_{MOTORACC}$ is multiplied by the inertia motor data to provide an angular acceleration ($\alpha_{MOTOR}$). The velocity calculating module 104 calculates $\omega_{MOTOR}$ based on $\alpha_{MOTOR}$ and a time step ($t_K$). The position calculating module 106 calculates $P_{COINT}$ based on $\omega_{MOTOR}$, $M_{POS}$, $t_K$ and the gear ratio motor data.

Figure 5:
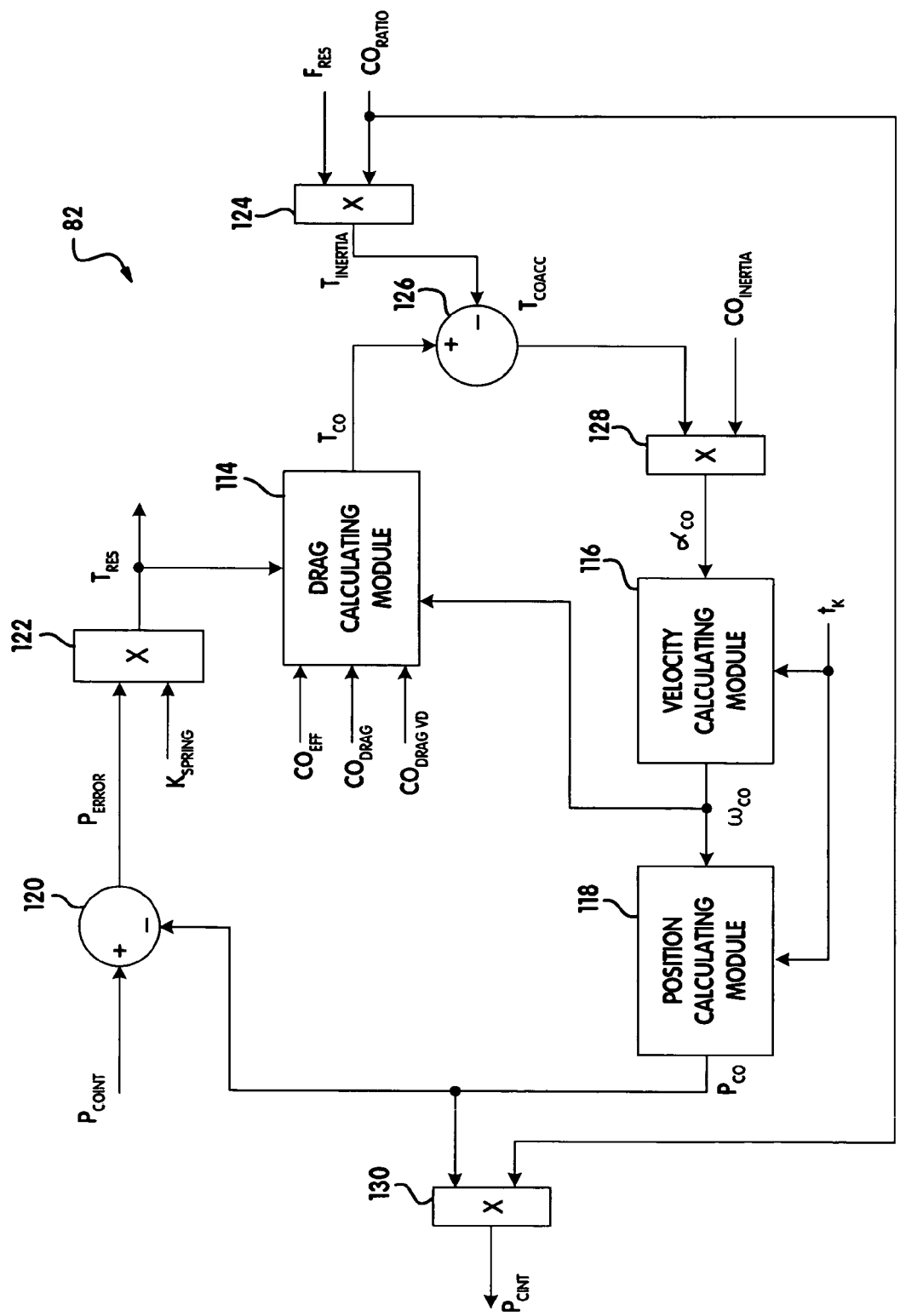
FIG. 5 is a logic diagram illustrating a clutch operator module according to the present invention.

Referring now to FIG. 5, the clutch operator module 82 will be explained in detail. The clutch operator data includes a spring rate ($k_{SPRING}$), an efficiency ($CO_{EFF}$), a drag factor ($CO_{DRAG}$), a viscous damper drag factor ($CO_{DRAGVD}$), a position ratio ($CO_{RATIO}$) and an inertia ($CO_{INERTIA}$). The clutch operator module 82 includes a drag calculating module 114, a velocity calculating module 116 and a position calculating module 118. A clutch operator position ($P_{CO}$) is subtracted from $P_{COINT}$ by a summer 120 to provide a position error ($P_{ERROR}$). $P_{CO}$ is calculated by the position calculating module 118 as discussed below. A multiplier 122 multiplies $P_{ERROR}$ and $k_{SPRING}$ to provide $T_{RES}$.

The drag calculating module 114 calculates a clutch operator torque ($T_{CO}$) based on $CO_{EFF}$, $CO_{DRAG}$, $CO_{DRAGVD}$, $T_{RES}$ and a clutch operator angular velocity ($\omega_{CO}$). More particularly, the drag calculating module 114 updates $T_{RES}$ to account for efficiency losses and calculates a drag torque and a viscous damper drag torque. The drag torque and viscous damper drag torque are subtracted from the updated $T_{RES}$ to provide $T_{CO}$. An inertia torque ($T_{INERTIA}$) is determined as the product of $F_{RES}$ and $CO_{RATIO}$ by a multiplier 124. $T_{INERTIA}$ is subtracted from $T_{CO}$ by a summer 126 to provide a clutch operator acceleration torque ($T_{COACC}$). A clutch operator angular acceleration ($\alpha_{CO}$) is determined as the product of $T_{COACC}$ and $CO_{INERTIA}$ by a multiplier 128. The velocity calculating module 116 calculates $\omega_{CO}$ based on $\alpha_{CO}$ and $t_K$. The position calculating module 118 calculates $P_{CO}$ based on $\omega_{CO}$ and $t_K$. $P_{CINT}$ is determined as the product of $P_{CO}$ and $CO_{RATIO}$ by a multiplier 130.

Figure 6:
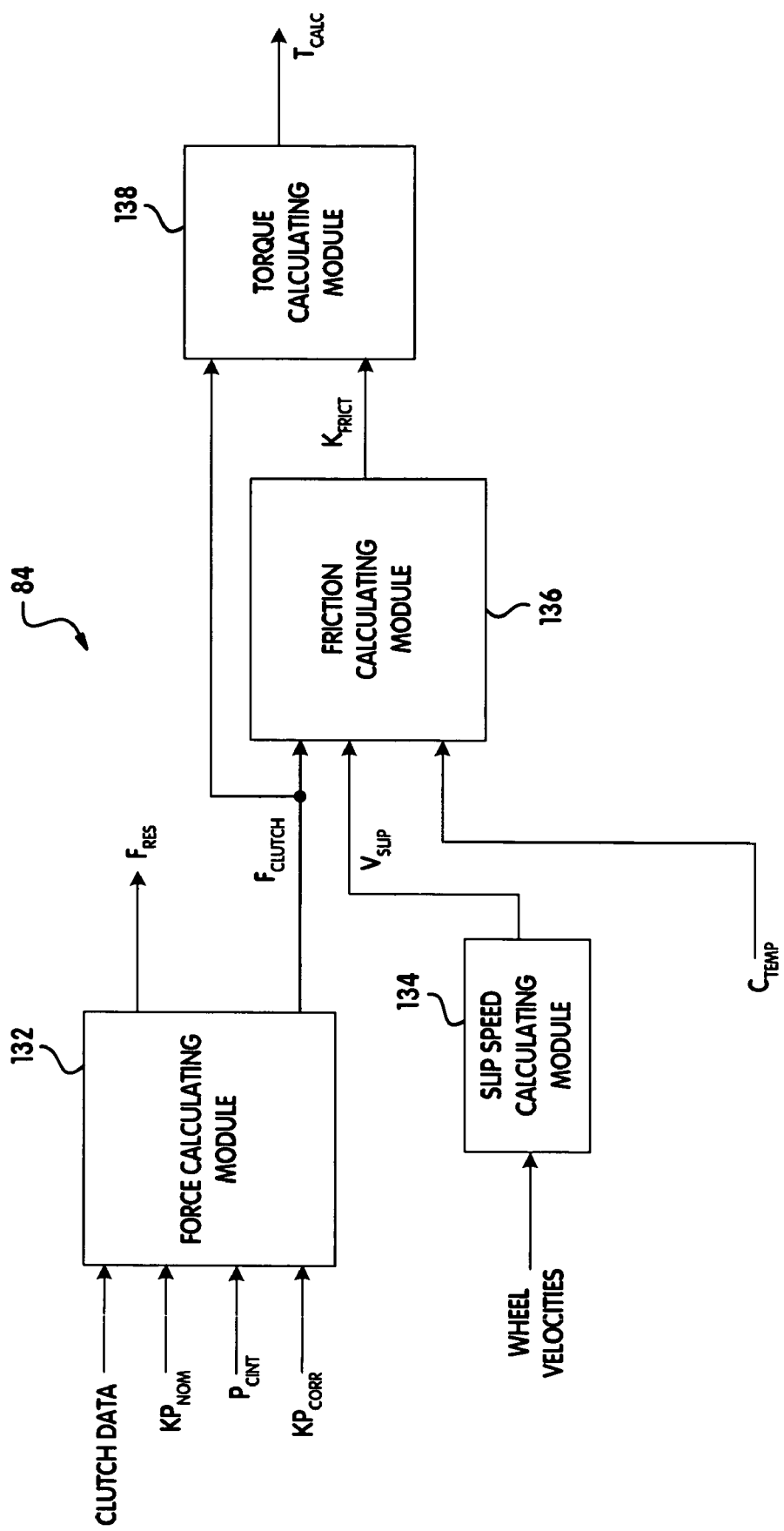
FIG. 6 is a logic diagram illustrating a clutch module according to the present invention.

Referring now to FIG. 6, the clutch module 84 will be described in detail. The clutch data includes an active ready control factor and a back stop position. The clutch module 84 includes a force calculating module 132, a slip speed calculating module 134, a friction module 136 and a torque calculating module 138. The force calculating module 132 determines $F_{RES}$ and a clutch force ($F_{CLUTCH}$) based on the clutch data, a nominal kiss point ($KP_{NOM}$), $P_{CINT}$ and a kiss point correction ($KP_{CORR}$). More particularly, $P_{CINT}$ is corrected based on $KP_{CORR}$. $KP_{CORR}$ is continuously updated to account for tolerances and wear in the clutch. $F_{CLUTCH}$ is determined from a series of look-up tables based on the corrected $P_{CINT}$. $F_{CLUTCH}$ is determined from test data averaged from various torque biasing systems instrumented to measure force at the clutch based on actuator position. Because there is normally a difference between engaging and releasing (i.e., hysteresis) multiple traces are collected. The direction of travel determines which table is used and filtering is applied to ensure smooth transitions.

$F_{CLUTCH}$ is further determined based on a negative clutch force ($F_{CLUTCHNEG}$), the corrected $P_{CINT}$, $KP_{NOM}$ and the active ready control factor. $F_{CLUTCHNEG}$ is a fictitious number that implies that the "actual" torque at the clutch is negative when the system is below the kisspoint of the clutch. In this manner, the system is maintained at the active ready position when there is a low torque request. This is achieved by providing a significant control error if the position is below the kisspoint. Without $F_{CLUTCHNEG}$, the system would calculate zero torque for any position below the kisspoint causing minimal control error for low torque requests regardless of position. Additionally, $F_{CLUTCHNEG}$ is a direct gain on position below kisspoint and is tuned for optimum response and stability. $KP_{NOM}$ is a constant that is stored in memory and indicates the nominal kiss point (i.e., the point at which the clutch plates engage) for the particular clutch model. $F_{CLUTCH}$ is calculated as the difference of $F_{CLUTCHINT}$ and $F_{CLUTCHNEG}$.

The slip speed calculating module 134 calculates wheel slip ($v_{SLIP}$) based on the wheel speed signals generated by the sensor group 56. The friction calculating module 138 calculates a coefficient of friction ($K_{FRICT}$) based on $F_{CLUTCH}$, $v_{SLIP}$ and $C_{TEMP}$. More particularly, the friction module 136 determines $K_{FRICT}$ from a three-dimensional look-up table based on $F_{CLUTCH}$, $v_{SLIP}$ and $C_{TEMP}$. The torque calculating module 138 calculates $T_{CALC}$ based on $K_{FRICT}$ and $F_{CLUTCH}$. $T_{CALC}$ is determined according to the following equation:

$$T_{CALC} = F_{CLUTCH} * N_{PLATES} * R_{EFF} * K_{FRICT}$$

where $N_{PLATES}$ is the number of clutch plates and $R_{EFF}$ is the effective radius of the clutch plates. $N_{PLATES}$ and $R_{EFF}$ are constants based on clutch geometry. No hysteresis is assumed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque biasing system, comprising:
   a clutch pack;
   a motor that manipulates engagement of said clutch pack based on a control signal; and
   a control module that generates said control signal based on a torque command and a calculated torque, wherein said calculated torque is based on a calculated interconnection position of said clutch pack and wherein said calculated interconnection position is based on a model of said torque biasing system.

2. The torque biasing system of claim 1 further comprising a clutch operator mechanism that is driven by said motor and that imparts a linear force on said clutch pack.

3. The torque biasing system of claim 1 wherein said control signal is based on a difference between said torque command and said calculated torque.

4. The torque biasing system of claim 1 wherein said model of said torque biasing system includes a motor module, a clutch operator module and a clutch pack module.

5. The torque biasing system of claim 4 wherein said motor module generates a first position signal based on said control signal, a motor armature position, a motor temperature, a motor current, motor data and a resistance torque generated by said clutch operator module.

6. The torque biasing system of claim 4 wherein said clutch operator module generates a second position signal and a resistance torque based on a first position signal generated by said motor module, clutch operator data and a resistance force generated by said clutch module, said second position signal corresponding to said calculated interconnection position.

7. A torque biasing system comprising:
   a clutch pack;
   a motor that manipulates engagement of said clutch pack based on a control signal; and
   a control module that generates said control signal based on a torque command and a calculated torque, wherein said calculated torque is determined based on a model of said torque biasing system and wherein said motor includes a position sensor that generates an armature position signal, a temperature sensor that generates a temperature signal and a current sensor that generates a current signal, wherein said calculated torque is determined based on said armature position signal, said temperature signal and said current signal.

8. A torque biasing system comprising:
   a clutch pack;
   a motor that manipulates engagement of said clutch pack based on a control signal; and
   a control module that generates said control signal based on a torque command and a calculated torque, wherein said calculated torque is determined based on a model of said torque biasing system and wherein said clutch pack includes a temperature sensor that generates a temperature signal, wherein said calculated torque is determined based on said temperature signal.

9. A torque biasing system comprising:
   a clutch pack;
   a motor that manipulates engagement of said clutch pack based on a control signal; and
   a control module that generates said control signal based on a torque command and a calculated torque, wherein said calculated torque is determined based on a model of said torque biasing system, wherein said model of said torque biasing system includes a motor module, a clutch operator module and a clutch pack module, and wherein said clutch module determines said calculated torque and a resistance force based on a second position signal generated by said clutch operator module, clutch data, a clutch temperature and clutch kiss point data.

10. A method of controlling a torque biasing system, comprising:
    generating a torque command;
    calculating an interconnection position of a clutch of said torque biasing system based on a model of said torque biasing system;
    determining a calculated torque based on said calculated interconnection position;
    determining a control signal based on said torque command and said calculated torque; and
    controlling said torque biasing system based on said control signal.

11. The method of claim 10 wherein said control signal is based on a difference between said torque command and said calculated torque.

12. The method of claim 10 further comprising generating a first position signal in a motor module based on said control signal, a motor armature position, a motor temperature, a motor current, motor data and a resistance torque generated by a shift system module.

13. The method of claim 10 further comprising generating a second position signal corresponding to said calculated interconnection position and a resistance torque in a clutch operator module based on a first position signal generated by a motor module, clutch operator data and a resistance force generated by a clutch module.

14. A method of controlling a torque biasing system, comprising:
    generating a torque command;
    determining a calculated torque based on a model of said torque biasing system;
    determining a control signal based on said torque command and said calculated torque; and
    controlling said torque biasing system based on said control signal,
    wherein said calculated torque is determined based on an armature position, a motor temperature and a motor current.

15. A method of controlling a torque biasing system, comprising:
    generating a torque command;
    determining a calculated torque based on a model of said torque biasing system;
    determining a control signal based on said torque command and said calculated torque; and
    controlling said torque biasing system based on said control signal,
    wherein said calculated torque is determined based on a clutch temperature.

16. A method of controlling a torque biasing system, comprising:
    generating a torque command;
    determining a calculated torque based on a model of said torque biasing system;
    determining a control signal based on said torque command and said calculated torque; and
    controlling said torque biasing system based on said control signal; and
    determining said calculated torque and a resistance force in a clutch model based on a second position signal generated by a clutch operator module, clutch data, a clutch temperature and kiss-point data.

17. A method of controlling a torque biasing system, comprising:
    determining a torque command;
    calculating a model-based torque based on a calculated interconnection position of a clutch of said torque biasing system;
    calculating a torque error based on said torque command and said model-based torque;
    generating a control signal based on said torque error; and
    operating said torque biasing system based on said control signal.

18. The method of claim 17 further comprising processing a previous control signal through a torque biasing system model to generate said model-based torque.

19. The method of claim 18 wherein said torque biasing system model includes a motor model, a clutch operator model and a clutch model.

20. The method of claim 19 further comprising processing said control signal through said motor model to generate a clutch operator interconnection value.

21. The method of claim 20 wherein said clutch operator interconnection value is generated based on a resistance torque, a motor position signal and motor data.

22. The method of claim 21 further comprising calculating said resistance torque using said clutch operator model.

23. The method of claim 19 further comprising processing an interconnection position value through said clutch operator model to generate said calculated interconnection position of said clutch.

24. The method of claim 23 wherein said calculated interconnection position is generated based on a resistance force and clutch operator data.

25. The method of claim 24 further comprising calculating said resistance force using said clutch model.

26. The method of claim 19 further comprising processing a said calculated interconnection position through said clutch model to generate said model-based torque.

27. A controller for a torque biasing system including a clutch and a motor that manipulates engagement of said clutch via a clutch operator, the controller comprising:
  a motor control module that generates a motor control signal;
  a motor module that generates a calculated clutch operator position signal based on said motor control signal;
  a clutch operator module that generates a calculated clutch interconnection signal based on said calculated clutch operator position signal;
  a clutch module that generates a calculated torque signal based on said calculated clutch interconnection signal;
  wherein said motor control signal is based on said calculated torque signal.

28. The controller of claim 27 wherein said calculated clutch operator position signal is generated by said motor module based on motor data including at least one of: current to torque conversion factor data, back EMF constant data, brake-on drag data, brake-off drag data, viscous drag data, coil resistance data, inertia data, and gear ratio data.

29. The controller of claim 27 wherein said calculated clutch operator position signal is generated by said motor module based on at least one of: motor position data, motor temperature data, and motor electrical current data.

30. The controller of claim 27 wherein said calculated clutch interconnection signal is generated by said clutch operator module based on clutch operator data including at least one of: spring rate data, efficiency data, drag factor data, viscous damper drag factor data, position ratio data, and inertia data.

31. The controller of claim 27 wherein said calculated torque signal is generated by said clutch module based on at least one of: negative clutch force data, nominal kiss point data, kiss point correction data, number of clutch plates data, effective clutch plate radius data, clutch geometry data, clutch temperature data, and wheel slip data.

32. The controller of claim 27 wherein said motor control module receives a torque command signal and generates said motor control signal based on a difference between said torque command signal and said calculated torque signal.

* * * * *